United States

Takahashi et al.

[11] 3,926,503
[45] Dec. 16, 1975

[54] LARGE APERTURE SEMI-WIDE ANGLE LENS

[75] Inventors: Yasuo Takahashi; Michiro Oishi, both of Tokyo, Japan

[73] Assignee: Asahi Kogaku Kogyo Kabushiki Kaisha, Tokyo, Japan

[22] Filed: Aug. 15, 1974

[21] Appl. No.: 497,605

[30] Foreign Application Priority Data
Aug. 24, 1973 Japan.............................. 48-95502

[52] U.S. Cl................................. 350/215; 350/176
[51] Int. Cl.².......................................... G02B 9/62
[58] Field of Search..................... 350/215, 176, 214

[56] References Cited
UNITED STATES PATENTS
2,969,713   1/1961   Mukai.................................. 350/214
3,506,336   4/1970   Takahashi......................... 350/214 X FOREIGN PATENTS OR APPLICATIONS
1,072,402   12/1959   Germany............................ 350/215

Primary Examiner—John K. Corbin
Attorney, Agent, or Firm—Wolder & Gross

[57] ABSTRACT

A semi-wide angle well corrected aberration seven element lens system includes from the front successively a negative meniscus first lens, a positive second lens, a positive meniscus third lens, a negative meniscus fourth lens, a negative fifth lens, and a positive sixth joined at their confronting faces to form a doublet, and a positive seventh lens. The lens system satisfies the following conditions:

$F/0.55 < /F_1/ < F/0.35, F_1 < 0$
$F/1.4 < F_{1,2,3} < F/0.9$
$F/0.5 < F_{1,2,3,4} < F/0.15$
$\nu_1 > 55$ $$47 > \frac{\nu_2 + \nu_3}{2} > 35$$

$n_6, n_7 > 1.70$ wherein $F$ is the composite focal length of the lens system; $F_{1....i}$ is the composite focal length of the first to the ith lens; $\nu_i$ is the Abbe's number of the ith lens and $n_i$ is the refractive index of the ith lens. A diaphragm is located between the fourth and fifth lenses.

2 Claims, 4 Drawing Figures

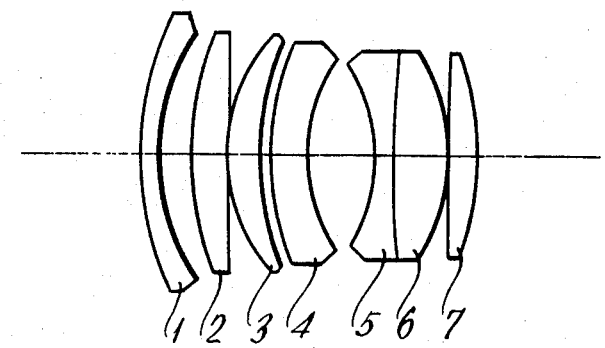
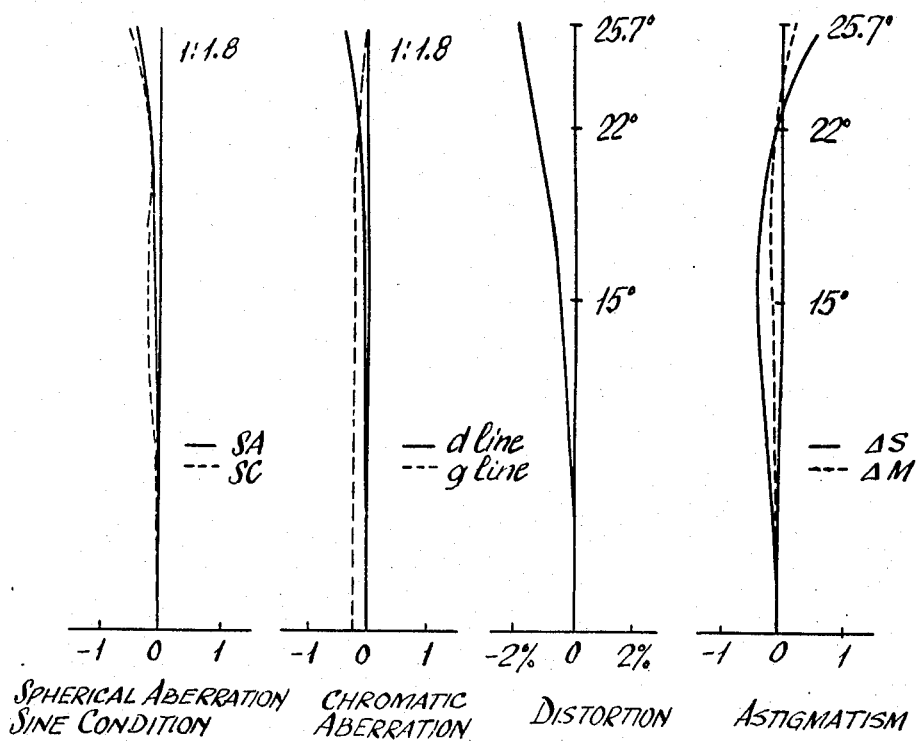

LARGE APERTURE SEMI-WIDE ANGLE LENS

BACKGROUND OF THE INVENTION

The present invention relates generally to improvements in lens systems, and it relates more particularly to an improved semi-wide angle objective lens system of low aberration.

It is frequently desirable to employ in a camera a semi-wide angle objective lens of high aperture and of well corrected aberrations. However, the conventional large aperture semi-wide angle objective lens systems of well corrected aberrations possess numerous drawbacks and disadvantages. They are complex and expensive devices, require non-conventional lens materials and are difficult to fabricate by mass production, are lacking in optimum optical characteristics and otherwise leave much to be desired.

SUMMARY OF THE INVENTION

It is a principal object of the present invention to provide an improved multi-element lens system.

Another object of the present invention is to provide an improved semi-wide angle, well corrected aberration, large aperture objective lens system.

Still another object of the present invention is to provide an improved objective lens system of the above nature characterized by its superior optical properties, ease of fabrication, particularly by mass production methods, low cost and high versatility and adaptability.

The above and other objects of the present invention will become apparent from a reading of the following description taken in conjunction with the accompanying drawings which illustrate preferred embodiments thereof.

In a sense, the present invention contemplates the provision of an improved semi-wide angle lens system of well corrected aberrations including seven successively designated lenses as from the front to the rear of the lens system, the lens system satisfying the following conditions:

$$F/0.55 < |F_1| < F10.35, F_1 < 0 \quad (1)$$

$$F/1.4 < F_{1.2.3} < F/0.9 \quad (2)$$

$$F/0.5 < F_{1.2.3.4} < F/0.15 \quad (3)$$

$$\nu_1 < 55 \quad (4)$$

$$47 > \frac{\nu_2 + \nu_3}{2} 35$$

$$n_6, n_7 < 1.70 \quad (6)$$

wherein $F$ is the composite focal length of the lens system; $F_{1...i}$ is the composite focal length of the first to the ith lens; $n_i$ is Abbe's number of the ith lens and $\nu_i$ is the refractive index of the ith lens.

The lens system advantageously has a back focus of at least 0.77F and an angle of view of at least 48°. The fifth and sixth lenses are joined at their confronting faces to form a doublet and the first, fourth and fifth lenses are negative, and the remaining lenses are positive. Preferably the first lens is a negative meniscus lens with a convex front face, the second lens is biconvex, the third lens is a positive meniscus lens with a convex front face, the fourth lens is a negative meniscus lens with a convex front face, the fifth lens is biconcave and the sixth and seventh lenses are biconvex. A diaphragm of suitable construction is positioned between the fourth and fifth lenses.

The following is given by way of explanation of the functions and operations of the above conditions wherein $f_B$ is the back focus, $r_j$ is the radius of curvature of the jth lens face, and lens faces being designated from the front face to the rear face successively as the first to the fifteenth, the joined confronting faces of the fifth and sixth lens defining a single face and $d_j$ is the distance between the jth lens face and the j+1 lens face and is either a lens space or lens thickness:

Condition 1: In a lens system having an angle of view of about 48° and an aperture larger than 1:2.0, an excessive burden is sometimes applied to the second and subsequent lenses when it is attempted to obtain a backfocus $f_B$ exceeding 0.77F. To eliminate this disadvantage condition 1 must be satisfied. It is apparent that the total length of the lens system and the diameter of each lens element can be reduced by selecting a small distance, $d_2$ between the second and third lens faces. If $F_1$ is negative, and the absolute value thereof is smaller than $F/0.55$, it is an impediment to the selection of a longer $f_B$. In this case, however, increased aberrations are developed at the second surface and the subsequent lens groups will have to bear various burdens to eliminate these aberrations. In a lens system of the present type the second and third lenses must bear the increased burdens. This may be eliminated only by the use of an increased number of lenses or by employing a lens material with a refractive index larger than that defined by Condition 6, and is thus undesirable. Conversely, when $f_B$ is larger than $F/0.35$, the back focus presents only a limited effect and the desired results cannot be attained unless a large $d_2$ value is selected.

Condition 2: This is a condition for determining the powers of the 1st to the 3rd lenses under condition 1. In other words, condition 2 determines the powers of the positive lenses included in the front lens group. When $F_{1.2.3}$ is shorter than $F/1.4$, it is difficult to obtain a long $f_B$. If, for the purpose of overcoming this difficulty $F_{1.2.3.4}$ is selected to be as long as possible, then the Petzval sum is reduced and a desired wide angle lens cannot practically be obtained. Conversely, when $F_{1.2.3}$ is longer than $F/0.9$, this is advantageous for $f_B$ but the 1st to 3rd lenses must be properly corrected in accordance with conditions 4 and 5 for controlling the chromatic aberration of front lens group by the lenses up to the fourth lens. To attain this correction $(\nu_2 + \nu_3)/2$ must be maintained at less than 35, which adversely effects the change in the transverse chromatic aberration and is thus undesirable.

Condition 3: This is a condition for determining the diopter or power of the fourth lens. In accordance with this condition as well as with condition 5, the material for the 4th lens is determined taking the chromatic aberrations by the first to the fourth lenses into consideration. When $F_{1.2.3.4}$ is smaller than $F/0.5$, this is disadvantageous for $f_B$ and the lens materials must be those having $\nu$-values which are small enough to properly maintain the chromatic aberration. This sometimes makes it necessary to select a lens material having inferior workability and suitability for mass production and/or providing a transmitted light having an inferior color. Conversely, when $F_{1.2.3.4}$ exceeds $F/0.15$, it is advantageous for $f_B$ but will give the rear lens group a power which is increased in the positive direction. As a result, the spherical aberration is increased, especially, at 11th and 12th lens surfaces until the aberration balance cannot be further maintained.

Condition 4: This is a condition for reducing the transverse chromatic aberration. To increase $f_B$ by giving the 1st lens a considerably large power and keeping $r_2$ at a relatively small value, $\nu_1$ must be of the order of 55. To reduce the chromatic aberration, condition 4 must be satisfied.

Condition 5: As will be appreciated from the foregoing description, this is a condition for minimizing the chromatic aberration of the lenses up to fourth lens.

Condition 6: In conjunction with condition 3, condition 6 is for minimizing the spherical aberration. This condition as well as the reference index and $\nu$-value determine the rear lens group.

The invention will be understood more fully from the following Tables representing two embodiments of this invention and Seidel's Coefficient Tables for these embodiments.

The improved semi-wide angle objective lens system possesses excellent optical properties, is inexpensive and of high versatility and adaptability.

BRIEF DESCRIPTION OF THE DRAWINGS

FIG. 3 is a view similar to FIG. 1 of another embodiment of the invention; and

FIG. 4 is a graph representing the aberration curves of the system of Claim 3.

DESCRIPTION OF THE PREFERRED EMBODIMENTS

Figure 1:
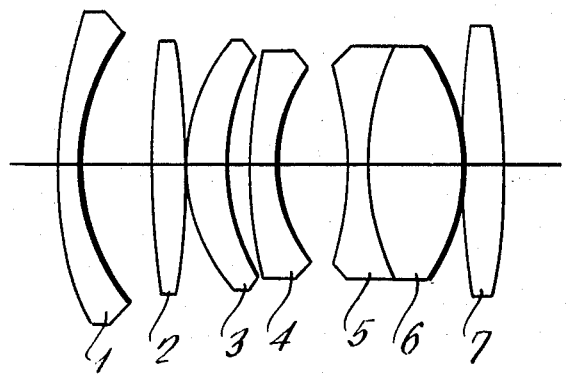
FIG. 1 is a diagrammatic side elevational view of a lens system embodying the present invention.
Figure 2:
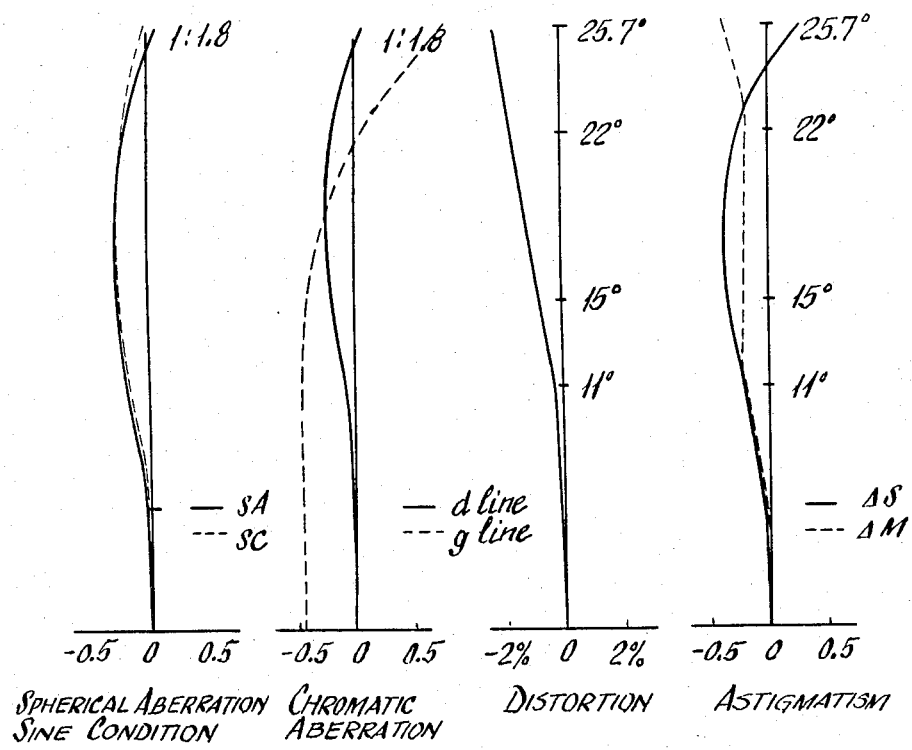
FIG. 2 is a graph representing the aberration curves of the system of FIG. 1.

Referring now to the drawings, particularly FIGS. 1 and 2 thereof, which illustrate a preferred embodiment of the present invention, the improved lens system includes seven lenses or elements consecutively designated from the front to the rear as 1 to 7 respectively, the confronting faces of the fifth and sixth lenses 5 and 6 being joined in mating engagement to form a doublet. The lens faces are successively designated from the first to the thirteenth.

The first lens 1 is a negative meniscus lens with a convex front or first face of radius of curvature $r_1$, a concave rear or second face of radius of curvature $r_2$, a refractive index $n_1$ and Abbe's number $\nu_1$ and a thickness $d_1$. The second lens 2 is biconvex with a third face spaced a distance $d_2$ from the second face and of radius of curvature $r_3$ and a fourth face of radius of curvature $r_4$, the lens having a thickness $d_3$, a refractive index $n_2$ and an Abbe's number $\nu_2$. The third lens 3 is a positive meniscus lens with a convex front fifth face of radius of curvature $r_5$ spaced a distance $d_4$ from the lens fourth face, a rear concave sixth face of radius of curvature $r_6$, third lens 3 having a thickness $d_5$ a refractive index $n_3$ and an Abbe's number $\nu_3$. The fourth lens 4 is a negative meniscus lens with a convex front seventh face of radius of curvature $r_7$ spaced a distance $d_6$ from the lens sixth face and a rear concave eighth face of radius of curvature $r_8$, fourth lens 4 having a thickness $d_7$, a refractive index $n_4$ and an Abbe's number $\nu_4$. The fifth lens 5 is biconcave with a front ninth face of radius of curvature $r_9$ spaced a distance $d_8$ from the lens eighth face and a rear tenth face of radius of curvature $r_{10}$, fifth lens 5 having a thickness $d_9$, a refractive index $n_5$ and an Abbe's number $\nu_5$. The sixth lens 6 is biconvex with a front face in mating engagement with the fifth lens rear face and a rear eleventh face of radius of curvature $r_{11}$, sixth lens 6 having a thickness $d_{10}$, a refractive index $n_6$ and an Abbe's number $\nu_6$. Fifth and sixth lenses 5 and 6 form a doublet with a commonly designated tenth inside face. The seventh lens 7 is biconvex with a front twelfth face of radius of curvature $r_{12}$ spaced a distance $d_{11}$ from lens eleventh face and a rear thirteenth face of radius of curvature $r_{13}$, seventh lens 7 having a thickness $d_{12}$, a refractive index $n_7$ and an Abbe's number $\nu_7$. The interface distances and thicknesses are axially measured.

The following Table I sets forth a specific numeral example of the lens of FIG. 1 in which the dimension and parameter designations are as above set forth, and the values are based on a system focal length $F = 100$.

TABLE I

| | | | | | |
|---|---|---|---|---|---|
| $r_1$ | 83.826 | $d_1$ | 4.78 | $n_1/\nu_1$ | 1.55671/58.7 |
| $r_2$ | 50.446 | $d_2$ | 19.85 | | |
| $r_3$ | 304.333 | $d_3$ | 7.39 | $n_2/\nu_2$ | 1.79952/42.3 |
| $r_4$ | −203.478 | $d_4$ | 0.24 | | |
| $r_5$ | 46.739 | $d_5$ | 11.00 | $n_3/\nu_3$ | 1.80610/40.8 |
| $r_6$ | 74.000 | $d_6$ | 3.65 | | |
| $r_7$ | 141.304 | $d_7$ | 7.11 | $n_4/\nu_4$ | 1.68893/31.1 |
| $r_8$ | 43.465 | $d_8$ | 18.33 | | |
| $r_9$ | −64.330 | $d_9$ | 3.28 | $n_5/\nu_5$ | 1.80518/25.4 |
| $r_{10}$ | 93.478 | $d_{10}$ | 21.74 | $n_6/\nu_6$ | 1.80610/40.8 |
| $r_{11}$ | −62.391 | $d_{11}$ | 0.22 | | |
| $r_{12}$ | 239.129 | $d_{12}$ | 10.87 | $n_7/\nu_7$ | 1.78590/44.2 |
| $r_{13}$ | −214.129 | | | | |

$F_1 = -239.8$
$F_{1,2,3} = 90.8$
$F_{1,2,3,4} = 458.6$

The following Table II sets forth Seidel's Coefficients for the specific lens system of Table I:

TABLE II

| Lens surface | $S_1$ | $S_2$ | $S_3$ | $S_4$ | $S_5$ |
|---|---|---|---|---|---|
| 1 | 0.390 | 0.100 | 0.026 | 0.427 | 0.116 |
| 2 | −3.768 | 0.444 | −0.052 | −0.709 | 0.090 |
| 3 | 0.233 | 0.203 | 0.176 | 0.146 | 0.280 |
| 4 | 0.226 | −0.335 | 0.497 | 0.218 | −1.062 |
| 5 | 1.578 | 0.231 | 0.034 | 0.955 | 0.145 |
| 6 | 0.012 | 0.072 | 0.441 | −0.603 | −0.991 |
| 7 | −0.109 | 0.235 | −0.744 | 0.289 | 1.189 |
| 8 | −0.773 | −0.421 | −0.230 | −0.939 | −0.637 |
| 9 | −0.761 | 0.573 | −0.431 | −0.693 | 0.847 |
| 10 | 0.002 | 0.001 | 0.001 | 0.000 | 0.001 |
| 11 | 1.895 | −0.561 | 0.166 | 0.715 | −0.261 |
| 12 | −0.000 | 0.002 | −0.193 | 0.184 | 0.724 |
| 13 | 1.321 | −0.582 | 0.257 | 0.206 | −0.204 |
| SUM | 0.247 | 0.013 | −0.053 | 0.196 | 0.237 |

Diaphragm, at the rear position to the 8th lens surface − 10.87

The excellent optical properties of the lens system of Table I are demonstrated by the curves of FIG. 2 showing spherical aberration and sine condition, chromatic aberration, distortion and astigmatism.

The lens system illustrated in FIG. 3 is similar to that shown in FIG. 1 with similar lenses being designated by the same reference numerals. The following Table III corresponds to Table 1 but presents a different specific numerical example of the embodiment shown in FIG. 3 and is based on a lens system focal length $F = 100$.

TABLE III

| | | | | | |
|---|---|---|---|---|---|
| $r_1$ | 107.532 | $d_1$ | 3.00 | $n_1/\nu_1$ | 1.62280/56.9 |
| $r_2$ | 57.140 | $d_2$ | 10.01 | | |
| $r_3$ | 115.150 | $d_3$ | 8.01 | $n_2/\nu_2$ | 1.84100/43.2 |
| $r_4$ | −2176.757 | $d_4$ | 0.19 | | |
| $r_5$ | 43.056 | $d_5$ | 8.01 | $n_3/\nu_3$ | 1.84100/43.2 |

TABLE III-continued

| | | | | | |
|---|---|---|---|---|---|
| $r_6$ | 77.571 | $d_6$ | 3.00 | | |
| $r_7$ | 81.911 | $d_7$ | 9.01 | $n_4/\nu_4$ | 1.80518/25.5 |
| $r_8$ | 34.393 | $d_8$ | 15.01 | | |
| $r_9$ | −43.535 | $d_9$ | 5.01 | $n_5/\nu_5$ | 1.75520/27.5 |
| $r_{10}$ | 191.990 | $d_{10}$ | 13.02 | $n_6/\nu_6$ | 1.76200/40.3 |
| $r_{11}$ | −53.548 | $d_{11}$ | 0.19 | | |
| $r_{12}$ | 242.491 | $d_{12}$ | 6.51 | $n_7/\nu_7$ | 1.72000/46.0 |
| $r_{13}$ | −115.616 | | | | |

$F_1 = -200.1$
$F_{1.2.3} = 76.7$
$F_{1.2.3.4} = 285.7$

The following Table IV sets forth Seidel's Coefficients for the specific lens system of Table III.

TABLE IV

| Lens surface | $S_1$ | $S_2$ | $S_3$ | $S_4$ | $S_5$ |
|---|---|---|---|---|---|
| 1 | 0.190 | 0.118 | 0.073 | 0.357 | 0.266 |
| 2 | −3.539 | −0.054 | −0.001 | −0.672 | −0.010 |
| 3 | 1.176 | 0.407 | 0.141 | 0.397 | 0.186 |
| 4 | 0.028 | −0.086 | 0.266 | 0.021 | −0.890 |
| 5 | 1.703 | 0.287 | 0.048 | 1.061 | 0.187 |
| 6 | 0.006 | −0.068 | 0.703 | −0.589 | −1.191 |
| 7 | −0.027 | 0.144 | −0.775 | 0.545 | 1.244 |
| 8 | −0.910 | −0.478 | −0.251 | −1.297 | −0.814 |
| 9 | −1.912 | 1.071 | −0.600 | −0.988 | 0.889 |
| 10 | 0.006 | 0.006 | 0.006 | 0.001 | 0.007 |
| 11 | 1.447 | −0.562 | 0.218 | 0.808 | −0.398 |
| 12 | −0.000 | −0.007 | −0.112 | 0.173 | 0.939 |
| 13 | 1.904 | −0.732 | 0.281 | 0.362 | −0.247 |
| SUM | 0.072 | 0.046 | −0.003 | 0.178 | 0.166 |

Diaphragm, at the rear position to the 8th lens surface — 8.4

The superior optical properties of the lens system of Table III are demonstrated by the curves of FIG. 4 in the manner of FIG. 2.

While there have been described and illustrated preferred embodiments of the present invention, it is apparent that numerous alterations, omissions and additions may be made without departing from the spirit thereof.

I claim:

1. A lens system comprising seven successively designated lenses arranged in six groups and possessing the following dimensions and relationships:

| | | | | | |
|---|---|---|---|---|---|
| $r_1$ | 83.826 | $d_1$ | 4.78 | $n_1/\nu_1$ | 1.55671/58.7 |
| $r_2$ | 50.446 | $d_2$ | 19.85 | | |
| $r_3$ | 304.333 | $d_3$ | 7.39 | $n_2/\nu_2$ | 1.79952/42.3 |
| $r_4$ | −203.478 | $d_4$ | 0.24 | | |
| $r_5$ | 46.739 | $d_5$ | 11.00 | $n_3/\nu_3$ | 1.80610/40.8 |
| $r_6$ | 74.000 | $d_6$ | 3.65 | | |
| $r_7$ | 141.304 | $d_7$ | 7.11 | $n_4/\nu_4$ | 1.68893/31.1 |
| $r_8$ | 43.465 | $d_8$ | 18.33 | | |
| $r_9$ | −64.330 | $d_9$ | 3.28 | $n_5/\nu_5$ | 1.80518/25.4 |
| $r_{10}$ | 93.478 | $d_{10}$ | 21.74 | $n_6/\nu_6$ | 1.80610/40.8 |
| $r_{11}$ | −62.391 | $d_{11}$ | 0.22 | | |
| $r_{12}$ | 239.129 | $d_{12}$ | 10.87 | $n_7/\nu_7$ | 1.78590/44.2 |
| $r_{13}$ | −214.129 | | | | |

$F_1 = -239.8$
$F_{1.2.3} = 90.8$
$F_{1.2.3.4} = 458.6$ wherein $F_{1...i}$ is the composite focal length of the first to the ith lens; $\nu$ is the Abbe's number of the ith lens, $N_i$ is the refractive index in the d-line of the ith lens, $r_j$ is the radius of curvature of the jth lens face and $d_j$ is the distance between the jth lens face and the $j + 1$ lens face, the lens faces being successively designated from the front to the rear face as the first to the thirteenth, the mating confronting surfaces of the fifth and sixth lenses defining a single face.

2. A lens system comprising seven successively designated lenses arranged in six groups and possessing the following dimensions and relationships:

| | | | | | |
|---|---|---|---|---|---|
| $r_1$ | 107.532 | $d_1$ | 3.00 | $n_1/\nu_1$ | 1.62280/56.9 |
| $r_2$ | 57.140 | $d_2$ | 10.01 | | |
| $r_3$ | 115.150 | $d_3$ | 8.01 | $n_2/\nu_2$ | 1.84100/43.2 |
| $r_4$ | −2176.757 | $d_4$ | 0.19 | | |
| $r_5$ | 43.056 | $d_5$ | 8.01 | $n_3/\nu_3$ | 1.84100/43.2 |
| $r_6$ | 77.571 | $d_6$ | 3.00 | | |
| $r_7$ | 81.911 | $d_7$ | 9.01 | $n_4/\nu_4$ | 1.80518/25.5 |
| $r_8$ | 34.393 | $d_8$ | 15.01 | | |
| $r_9$ | −43.535 | $d_9$ | 5.01 | $n_5/\nu_5$ | 1.75520/27.5 |
| $r_{10}$ | 191.990 | $d_{10}$ | 13.02 | $n_6/\nu_6$ | 1.76200/40.3 |
| $r_{11}$ | −53.548 | $d_{11}$ | 0.19 | | |
| $r_{12}$ | 242.491 | $d_{12}$ | 6.51 | $n_7/\nu_7$ | 1.72000/46.0 |
| $r_{13}$ | −115.616 | | | | |

$F_1 = 200.1$
$F_{1.2.3} = 76.7$
$F_{1.2.3.4} = 285.7$ wherein $F_{1...i}$ is the composite focal length of the first to the ith lens; $\nu$ is the Abbe's number of the ith lens, $N_i$ is the refractive index in the d-line of the ith lens, $r_j$ is the radius of curvature of the jth lens face and $d_j$ is the distance between the jth lens face and the $j + 1$ lens face, the lens faces being successively designated from the front to the rear face as the first to the thirteenth, the mating confronting surfaces of the fifth and sixth lenses defining a single face.

* * * * *